US012646634B2

(12) United States Patent
Baumann et al.

(10) Patent No.: US 12,646,634 B2
(45) Date of Patent: Jun. 2, 2026

(54) X-RAY IRRADIATION APPARATUS, INCLUDING A SPECTRALLY SHAPING X-RAY OPTIC AND A SPECTRAL FILTER APERTURE DEVICE, FOR X-RAY IMAGING

(71) Applicant: Universitaet Hamburg, Hamburg (DE)

(72) Inventors: Jonas Baumann, Berlin (DE); Christopher Philip Schlesiger, Berlin (DE); Florian Gruener, Hamburg (DE); Theresa Staufer, Hamburg (DE); Oliver Schmutzler, Hamburg (DE); Christian Koernig, Hamburg (DE)

(73) Assignee: UNIVERSITAET HAMBURG, Hamburg (DE)

( * ) Notice: Subject to any disclaimer, the term of this patent is extended or adjusted under 35 U.S.C. 154(b) by 174 days.

(21) Appl. No.: 18/720,855

(22) PCT Filed: Dec. 19, 2022

(86) PCT No.: PCT/EP2022/086677
§ 371 (c)(1),
(2) Date: Jun. 17, 2024

(87) PCT Pub. No.: WO2023/117921
PCT Pub. Date: Jun. 29, 2023

(65) Prior Publication Data
US 2025/0062048 A1 Feb. 20, 2025

(30) Foreign Application Priority Data
Dec. 21, 2021 (EP) .................................... 21216422

(51) Int. Cl.
*G21K 1/06* (2006.01)
*G01N 23/223* (2006.01)
(Continued)

(52) U.S. Cl.
CPC .......... *G21K 1/067* (2013.01); *G01N 23/223* (2013.01); *G21K 1/10* (2013.01); *G21K 5/04* (2013.01);
(Continued)

(58) Field of Classification Search
CPC G21K 1/067; G21K 1/10; G21K 5/04; G21K 2201/067; G21K 2201/064;
(Continued)

(56) References Cited

U.S. PATENT DOCUMENTS 5,127,028 A 6/1992 Wittry
5,128,028 A 7/1992 Lamort
(Continued)

FOREIGN PATENT DOCUMENTS

DE 102007018102 B4 9/2009
DE 112019004433 T5 5/2021
(Continued)

OTHER PUBLICATIONS

Machine Translation for DE 102007018102 B4 (2009).
(Continued)

*Primary Examiner* — Uzma Alam
*Assistant Examiner* — Mamadou Faye
(74) *Attorney, Agent, or Firm* — CAESAR RIVISE, PC

(57) ABSTRACT

An X-ray irradiation apparatus (100) comprises an X-ray source device (110) for creating X-rays (2) with a polychromatic spectrum and an X-ray optic device (120) with a beam axis (3) that is longitudinal, wherein the X-ray optic device (120) comprises a reflector device (121) that is polycrystalline having a reflector geometry, a reflector mosaicity and a reflector thickness and the reflector device (121) is arranged for receiving a portion of the X-rays (2) within an acceptance angle of the reflector device (121) and for creating an
(Continued)

Figure 1:
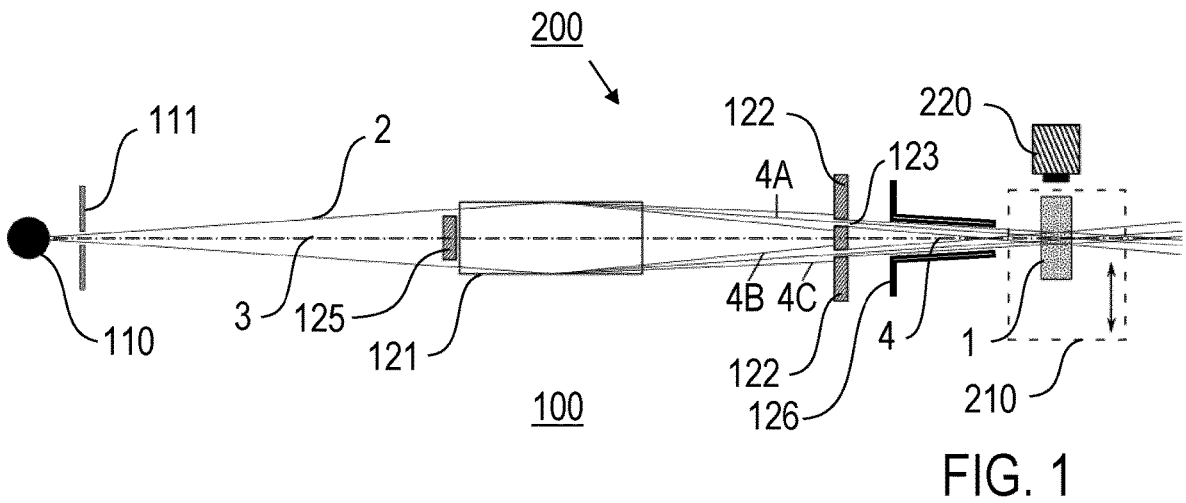

X-ray beam (4) by Bragg reflection, which is directed along the beam axis (3) towards a focal position thereof and has a spectral distribution determined by the polychromatic spectrum of the X-rays (2), the reflector geometry, the reflector mosaicity and the reflector thickness, and wherein the X-ray irradiation apparatus (100) further comprises a spectral filter aperture device (122) that is arranged downstream from the reflector device (121) for creating a filter gap (123) transmitting a first spectral portion (4A) of the spectral distribution of the X-ray beam (4) and blocking a second spectral portion (4B) and a third spectral portion (4C) of this spectral distribution, wherein the first spectral portion (4A) has higher energies than the second spectral portion (4B) and lower energies than the third spectral portion (4C), wherein the reflector device (121) has an acceptance solid-angle of at least 100 micro-steradian, and wherein the reflector geometry, the reflector mosaicity, the reflector thickness and the acceptance angle of the reflector device (121) are selected such that simultaneously a radiation flux in the first spectral portion (4A) is at least 1% of an incoming flux of the same spectral portion of the X-rays (2) received by the reflector device (121) with a peak reflectivity of at least 1%, the first spectral portion (4A) has a spectral bandwidth of at most 15%, the second and third spectral portions (4B, 4C) have a flux reduced by at least three orders of magnitude compared with the flux in the first spectral portion (4A), and the X-ray beam (4) has a focal spot size of less than 1.5 mm in both transverse dimensions relative to the longitudinal beam axis. Furthermore, an X-ray fluorescence imaging apparatus (200) and a method of using the X-ray irradiation apparatus (100) are described.

16 Claims, 4 Drawing Sheets

(51) Int. Cl.
      *G21K 1/10*          (2006.01)
      *G21K 5/04*          (2006.01)
(52) U.S. Cl.
      CPC ............... *G01N 2223/1016* (2013.01); *G01N 2223/406* (2013.01); *G21K 2201/067* (2013.01)
(58) Field of Classification Search
      CPC ...... G21K 1/02; G21K 1/06; G21K 2201/062; G01N 23/223; G01N 2223/1016; G01N 2223/406; G01N 2223/313; G01N 2223/315; G01N 2223/076; A61B 6/4071; A61B 6/06; A61B 6/485
      See application file for complete search history.

(56)                    References Cited

U.S. PATENT DOCUMENTS

|  |  |  |  |
|---|---|---|---|
| 6,023,496 A | 2/2000 | Kuwabara | |
| 10,962,491 B2 | 3/2021 | Yun et al. | |
| 11,583,237 B2 | 2/2023 | Gruener et al. | |
| 2004/0066894 A1 | 4/2004 | Holz et al. | |
| 2014/0334607 A1 | 11/2014 | Lopez et al. | |
| 2020/0072770 A1* | 3/2020 | Yun .................. | G21K 1/067 |
| 2021/0356412 A1 | 11/2021 | Yun et al. | |
| 2022/0370645 A1 | 11/2022 | Gruener | |

FOREIGN PATENT DOCUMENTS

|  |  |  |  |
|---|---|---|---|
| EP | 3610249 | 2/2020 | |
| JP | H06-118034 A | 4/1994 | |
| JP | H11-14570 A | 1/1999 | |
| JP | 2002-195963 A | 7/2002 | |
| WO | WO-0175488 A1 * | 10/2001 | ............ G21K 1/06 |
| WO | 02065481 A1 | 8/2002 | |
| WO | 2006022333 A1 | 3/2006 | |
| WO | 2008052002 A2 | 5/2008 | |
| WO | 2011073148 A1 | 6/2011 | |
| WO | 2018189051 A1 | 10/2018 | |
| WO | 2021078950 A1 | 4/2021 | |

OTHER PUBLICATIONS

English Abstract for JP H06-118034 (1994).
English Abstract for JP 2002-195963 A (2002).
English Abstract for WO 2006022333 A1 (2006).
Baldelli et al. (2003). Quasi-monochromatic x-rays for diagnostic radiology. Phys. Med. Biol. 48, 3653-3665.
Baldelli et al. (2005). A prototype of a quasi monochromatic system for mammography applications. Phys. Med. Biol. 50, 2225-2240.
Gerlach et al. (2015). Characterization of HAPG mosaic crystals using synchrotron radiation. J. Appl. Cryst., 48, 1381-1390.
Lawaczeck et al. (2005). Monochromatic X-rays in digital mammography. Investigative Radiology, 40(1), 33-39.
Rosentreter et al. (2017). Experimental investigation of a HOPG crystal fan for x-ray fluorescence molecular imaging. Medical Imaging 2017: Physics of Medical Imaging, Proc. of SPIE vol. 10132.
Rosentreter et al. (2021). X-ray fluorescence imaging: experimental and numerical analysis of a crystal based concept, Dissertation, Otto-von-Guericke-Universitaet Magdeburg.
Sanchez Del Rio et al. (2011). SHADOW3: a new version of the synchrotron X-ray optics modelling package. Journal of synchrotron radiation, 18 (Pt 5), 708-716.
Schlesiger et al. (2017). A new model for the description of X-ray diffraction from mosaic crystals for ray-tracing calculations. J. Appl. Cryst. 50, 1490-1497.
Smid et al. (2021). X-ray spectrometer simulation code with a detailed support of mosaic crystals. Computer Physics Communications, 262, 107811.
International Search Report for PCT/EP2022/086677 dated Feb. 6, 2023.

* cited by examiner

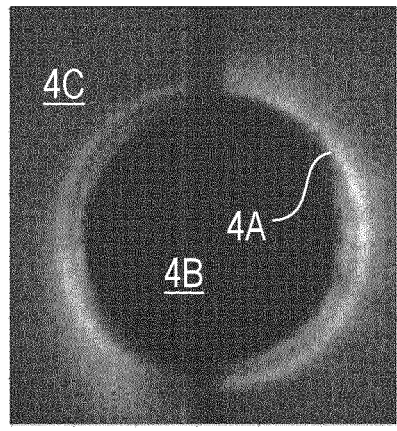
FIG. 7
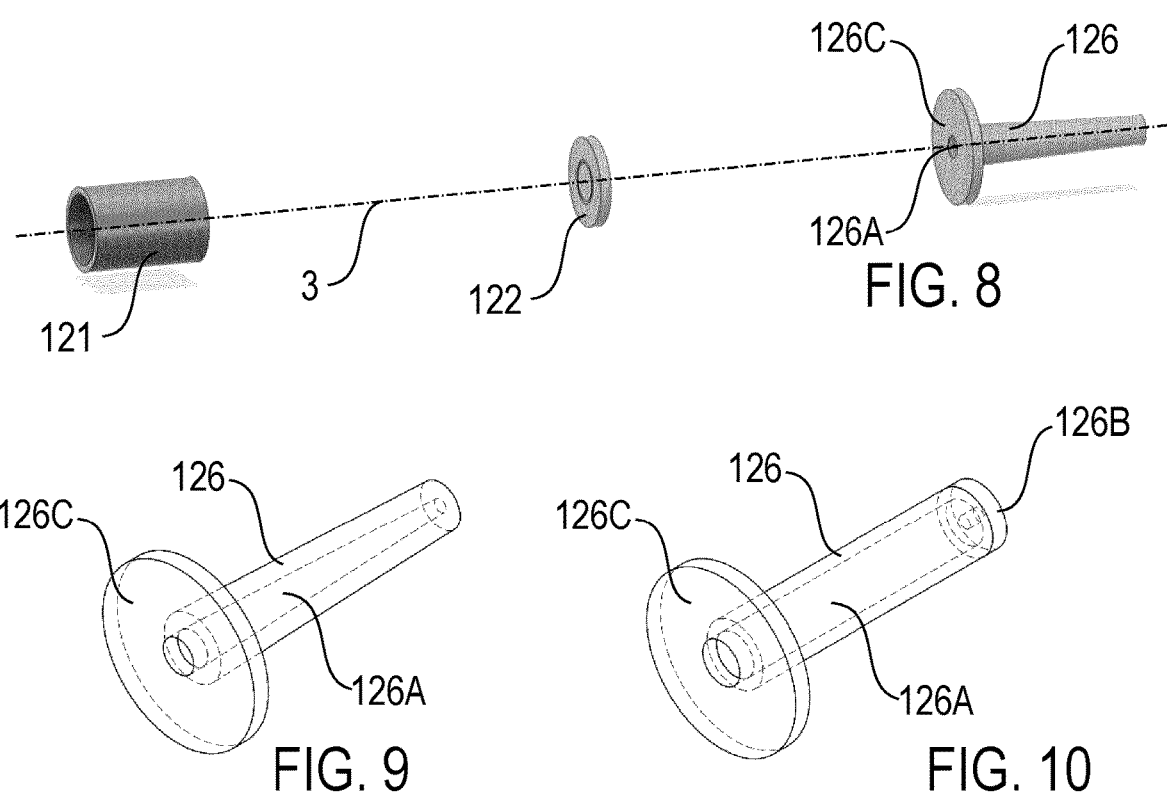
FIG. 8
FIG. 9
FIG. 10

X-RAY IRRADIATION APPARATUS, INCLUDING A SPECTRALLY SHAPING X-RAY OPTIC AND A SPECTRAL FILTER APERTURE DEVICE, FOR X-RAY IMAGING

CROSS-REFERENCE TO RELATED APPLICATIONS

This application is a U.S. National Phase Application of PCT/EP2022/086677, filed Dec. 19, 2022, which claims priority to EP 21216422.2, filed Dec. 21, 2021, the contents of which are incorporated herein by reference in their entireties for all purposes.

FIELD OF THE INVENTION

The invention relates to an X-ray irradiation apparatus for irradiating a sample to be investigated with X-rays, in particular to an X-ray irradiation apparatus comprising an X-ray source device for creating X-rays with a polychromatic spectrum and an X-ray optic device for selecting a spectral portion of the X-rays and directing the spectral portion of the X-rays to the sample. Furthermore, the invention relates to an X-ray fluorescence imaging apparatus, including the X-ray irradiation apparatus. Furthermore, the invention relates to methods of using the X-ray irradiation apparatus for X-ray imaging modalities, in particular for X-ray fluorescence imaging of a sample. Applications of the invention are available in the fields of employing X-rays for measuring, imaging, material processing and/or testing purposes.

TECHNICAL BACKGROUND

In the present specification, reference is made to the following prior art illustrating the technical background of the invention:

[1] Baldelli et al., "Quasi-monochromatic x-rays for diagnostic radiology" Phys. Med. Biol. 48 (2003) 3653-3665;
[2] Baldelli et al., "A prototype of a quasi-monochromatic system for mammography applications," Phys. Med. Biol. 50 (2005) 2225-2240;
[3] DE 11 2019 004 433 T5;
[4] WO 2011/073148 A1;
[5] Rosentreter et al. 2017 "Experimental investigation of a HOPG crystal fan for x-ray fluorescence molecular imaging" in "Medical Imaging 2017: Physics of Medical Imaging", Proc. of SPIE Vol. 10132, 2017;
[6] Lawaczeck et al., "Monochromatic X-rays in Digital Mammography" in "Investigative Radiology" vol. 40, 2005, p. 33;
[7] DE 10 2007 018 102 B4;
[8] WO 2008/052002 A2;
[9] WO 02/065481 A1;
[10] M. Gerlach et al. "Characterization of HAPG mosaic crystals using synchrotron radiation" in "J. Appl. Cryst." (2015), 48, 1381-1390;
[11] T. Rosentreter, "X-ray fluorescence imaging: experimental and numerical analysis of a crystal based concept", Dissertation, Otto-von-Guericke-Universitaet Magdeburg; 2021;
[12] EP 3 610 249 A1;
[13] WO 2021/078950 A1;
[14] M. S. Del Rio et al. in "Journal of synchrotron radiation" 18 (Pt 5), p. 708-716, 2011;
[15] M. Šmíd et al., in "Computer Physics Communications" 262, p. 107881, 2020;

[16] C. Schlesiger et al. in "J. Appl. Cryst." 50, p. 1490-1497, 2017;
[17] D. Girou et al. "Development of a second generation SiLC-based Laue lens" in "Proc. SPIE 10399—Optics for EUV, X-Ray, and Gamma-Ray Astronomy" VIII, 103991Y (4 Oct. 2017), doi: 10.1117/12.2273830;
[18] US 2021/356412 A1; and
[19] U.S. Pat. No. 5,127,028 A.

It is generally known that X-rays have been used in medical imaging for over 100 years. In addition to absorption imaging (e.g. computed tomography, CT, or projection X-ray imaging), further X-ray-based imaging modalities have been developed, such as phase contrast imaging or X-ray fluorescence imaging (XRF imaging). XRF imaging enables new preclinical and clinical applications, for example in accelerated drug development through improved pharmacokinetics with high spatial resolution and sensitivity, tracking of immune cells and in vivo determination of population dynamics of different immune cell types in infections or inflammatory diseases, as well as diagnostics, for example in tumors and metastases.

XRF imaging is based on labeling of substances, e.g. immune cells or drug molecules, to be imaged in vivo. Label atoms are coupled to the substances, which after excitation with X-rays emit fluorescence photons whose energies are also in the X-ray range, so that the signal can leave the sample, e.g. a human body or a small animal, and be measured by detectors. Advantageously and in contrast to other imaging methods (such as PET or MRI), XRF imaging allows an arbitrarily long diagnostic time window, since no radioactively decaying labels are used. Furthermore, XRF imaging allows a very wide range in the periodic table (all elements from about zirconium onwards) to be used as labels.

XRF imaging requires finely focused X-rays with a well-defined energy bandwidth and sufficient energy for exciting the fluorescence of the label atoms with sufficient spatial resolution and detection sensitivity. These requirements cannot be effectively fulfilled with usual X-ray sources. For example, in X-ray tubes, electrons are accelerated towards an anode by means of high voltage and emit X-ray quanta by collisions, but without a preferred direction. Thus, the radiation is isotropic and polychromatic. Only the so-called characteristic lines, which are generated by X-ray fluorescence of the anode material, have a narrow bandwidth, but they are just on top of a very broad continuous Bremsstrahlung-induced background. In addition, the maximum power of X-ray tubes is limited by the heat input of the electrons into the anode material.

The optimal conventional X-ray source for XRF imaging is a synchrotron, as this source can produce extremely narrow-band X-rays with very high flux in a very finely focused beam. Therefore, e.g. preclinical X-ray fluorescence-based studies are performed as basic research at large synchrotron facilities only. However, these large and costly facilities are not suitable for wider use or clinical applications or applications in laboratories, for example in the research-based pharmaceutical industry. The measuring stations for XRF imaging with a synchrotron are tied to the large-scale research facilities. That is, the objects to be examined must be transported there. An examination close to the laboratory or clinic is thus not possible. From many locations, long-distance, cross-border transport would be necessary. Also, specific sample environments are very costly or not feasible at all. Furthermore, the required investments for synchrotron facilities, as well as the cost of ownership, are so high that the possibilities offered by XRF imaging are not widely used.

Thus, compact X-ray sources are needed, especially for clinical studies and applications in clinical diagnostics. Laser-based X-ray sources (so-called Thomson sources) provide compact alternatives to synchrotron facilities, which nevertheless are still relatively expensive and maintenance-intensive. Furthermore, Thomson sources have disadvantages in terms of limited intensities, since the high-power lasers needed for this purpose currently still have too low a repetition rate and insufficient long-term stability. As a further alternative, conventional X-ray sources (X-ray tubes) which deliver divergent polychromatic radiation in principle have been combined with X-ray optics.

X-ray optics for photon energies above 50 keV can be reflective optics made of e.g. polycrystalline materials like Highly Oriented Pyrolytic graphite (HOPG) or Highly Annealed Pyrolytic Graphite (HAPG). Deflecting X-rays with X-ray optics is based on Bragg diffraction, which may be described in terms of grazing incidence reflection (Bragg lens, see e.g. [1] or [6]) or bulk reflection or transmission (Laue lens, see [17]) and which depends on the wavelengths of the X-rays, so that any X-ray deflection with Bragg-based X-ray optics is inherently combined with a wavelength (energy) selection effect. HOPG-based X-ray optics have been broadly used with plane reflectors (see e.g. [1] to [5]) or curved reflectors (see e.g. [6] to [9]). HAPG-based X-ray optics have been described e.g. in [10] and [11]. Main functions of conventional X-ray optics are deflecting an X-ray beam at a plane reflector, spectral filtering an X-ray beam and/or focusing an X-ray beam.

For the following reasons, conventional approaches of combining an X-ray tube with a polycrystalline X-ray optic, as described e.g. in [7] and [8], are suitable for XRF imaging in a limited manner only. Firstly, the wavelength selection effect has a limited efficiency, resulting in deflecting X-rays which also possess a relatively low energy, a relatively broad range of X-ray wavelengths and large spectral background noise (in particular [7]). XRF imaging tolerates only a certain bandwidth in the spectrum of the exciting X-ray beam, but this is limited to max. 15% FWHM. Larger bandwidths lead to a strong reduction of the detection sensitivity due to an increased multiple-scattering background in the measured spectral region of the XRF-signals. A maximum sensitivity requires a high degree of spectral purity of the scanning X-ray beam: a photon in the incident beam outside the desired narrow bandwidth can be Compton-scattered inside the scanned object to leave this object with the same energy as an XRF-photon, hence adding to the spectral background of the XRF-signal range and finally reducing the detection sensitivity. Conventional combinations of an X-ray source with an X-ray optic do not meet the bandwidth conditions required for XRF imaging. Furthermore, the radiation flux obtained with conventional X-ray optics is not sufficient for XRF imaging applications, which is important for in-vivo imaging where the exposure time needs to be minimal. As a further disadvantage, if the X-ray optic is adapted for focusing the X-rays (e.g. [8]), disadvantages result in terms of the imaging resolution as a cone-shaped beam is formed which illuminates a large portion of the object under investigation and hence worsens the spatial resolution.

According to [7], a therapeutic irradiation application of X-rays is described, wherein the energy of X-rays for treating a sample is selected with a polycrystalline X-ray optic. A collimator ring and a central beam stop are arranged just adjacent to the polycrystalline X-ray optic at a downstream side thereof. With the collimator ring, the shape of the X-ray radiation transmitted to a sample can be selected as it is required for the therapeutic irradiation application, e.g. for adapting the radiation to a complex shape of a tumor. In particular due to the broad band emission obtained with the technique of [7], it is not suitable for XRF imaging applications of X-rays.

Therefore, up to now, there is no compact X-ray source available that comes close to the requirements for XRF imaging, in particular if one wants to operate XRF at its sensitivity limit, in particular if as little label atoms as possible are to be detected in the X-ray beam volume at minimum radiation dose.

OBJECTIVE OF THE INVENTION

The objective of the invention is to provide an improved X-ray irradiation apparatus, e.g. for XRF imaging applications or other X-ray imaging modalities or other X-ray applications, being capable of avoiding limitations, in particular the aforementioned ones of conventional techniques. In particular, the X-ray irradiation apparatus is to be capable to create narrowband X-rays with higher photon energies, reduced spectral background and/or increased radiation flux. The X-ray irradiation apparatus should have a compact configuration, while being capable of creating X-rays with parameters comparable with X-rays created by synchrotron facilities. According to a particular aspect, the X-ray irradiation apparatus is to be capable of irradiating a sample under investigation for XRF imaging with increased sensitivity. Furthermore, the objective of the invention is to provide an improved X-ray fluorescence imaging apparatus and/or improved methods of creating X-rays for X-ray imaging, in particular X-ray fluorescence imaging a sample to be investigated.

BRIEF SUMMARY OF THE INVENTION

These objectives are correspondingly solved by an X-ray irradiation apparatus, an X-ray fluorescence imaging apparatus and methods of using the X-ray irradiation apparatus for X-ray imaging a sample to be investigated, comprising the features.

According to a first general aspect of the invention, the above objective is solved by an X-ray irradiation apparatus, being configured for irradiating a sample to be investigated. The sample comprises e.g. a biological material, in particular a human for clinical or a small animal for pre-clinical imaging, or parts thereof, or a phantom. The X-ray irradiation apparatus comprises an X-ray source device being arranged for creating X-rays with a polychromatic spectrum. Preferably, the X-ray source device comprises an X-ray source being configured for creating the X-rays by accelerating electrons from a cathode onto an anode, e.g. like an X-ray tube, in particular a clinical X-ray tube. Alternatively, another source, like e.g. an X-ray source based on irradiation of a target with accelerated electrons, including a linear accelerator, like a LINAC based source or a betatron X-ray source, or an X-ray source based on laser irradiation of a target, like a Thomson source or an inverse Compton-scattering X-ray source, or an X-ray source including a radioactive source can be employed, but a clinical X-ray tube is the least expensive and most widely used solution. Furthermore, the X-ray irradiation apparatus comprises an X-ray optic device with a longitudinal beam axis, wherein the X-ray optic device comprises a polycrystalline reflector device having a reflector geometry (in particular shape of reflector layer and/or layer sections thereof, e.g. radius or radii of curvature and size), a reflector mosaicity and a reflector thickness (thickness of reflector layer and/or layer sections thereof). The X-ray source device, e.g. an X-ray tube, in particular the anode thereof, or a LINAC or Thomson source, in particular an output end thereof, are arranged on the beam axis. The X-ray optic device is a reflective optic being arranged for receiving a portion of the X-rays from the X-ray source device within an acceptance solid angle of the X-ray optic device of at least 100 micro-steradian and for creating an X-ray beam by Bragg reflection (Bragg diffraction, in particular like a Bragg lens or a Laue lens), wherein the X-ray beam being directed along the beam axis towards a focal position thereof and having a spectral distribution determined by the polychromatic spectrum, the reflector geometry, the reflector mosaicity and the reflector thickness. The Bragg reflection occurs at crystal planes of the polycrystals only, i.e. there is no Bragg reflection at multilayer structures. Preferably, the reflector geometry is selected such that the reflector surface faces the beam axis with an axial symmetry relative to the beam axis. In particular, the reflector surface preferably completely surrounds the beam axis along the axial length of the reflector device. Alternatively, it is possible that the reflector surface partially surrounds the beam axis along the axial length of the reflector device.

The focal position of the X-ray optic device in the sample to be irradiated is determined by the Bragg reflection. Accordingly, the X-ray optic device is typically arranged at a half distance between the X-ray source device and the sample.

According to the invention, the X-ray irradiation apparatus includes a spectral filter aperture device being arranged with a distance downstream from the X-ray optic device, in particular downstream from the reflector device, for creating a filter gap transmitting a first spectral portion of the spectral distribution of the reflected X-ray beam and blocking a second and a third spectral portion of the spectral distribution of the reflected X-ray beam, wherein the first spectral portion has higher energies than the second spectral portion and lower energies than the third spectral portion. Advantageously, this blocking leads to a maximum in spectral purity of the scanning X-ray beam, hence meeting the above mentioned requirements for high-sensitivity XRF imaging in form of synchrotron-beam-like spectra with a narrow bandwidth and orders of magnitude reduction of photon flux outside this bandwidth. Blocking the second and third spectral portions of the spectral distribution of the reflected X-ray beam preferably comprises absorbing the second and third spectral portions of the spectral distribution, such that the number of photons per energy interval, e.g. per 100 eV, in the second and third spectral range is reduced by at least three orders of magnitude, hence delivering a very high degree of spectral purity. The spectral filter aperture device preferably comprises a ring-shaped X-ray transmissive diaphragm (ring-shaped X-ray transmissive aperture) providing the filter gap. The ring-shaped X-ray transmissive aperture is provided by a ring-shaped X-ray transmissive section, e.g. slit, which is arranged in a single sheet of X-ray blocking material. Alternatively, the ring-shaped X-ray transmissive aperture is provided between separate components of X-ray blocking material. The ring-shaped X-ray transmissive section preferably has a circular shape with the beam axis crossing the center of the X-ray transmissive section.

Advantageously, the ring-shaped filter aperture blocks mainly photons outside the narrow bandwidth and lets photons inside the bandwidth pass the filter. In the case of e.g. a W-anode and a 200 μm thick cylindrically shaped HOPG reflector, the additional reduction in photon numbers per spectral energy bin (e.g. 100 eV) of the second and third spectral portion is in the order of 3 orders of magnitude to fulfill the requirements of XRF imaging. This spatial filter concept is based on the inventor's finding of a very tight correlation between Bragg-reflected photon energy and the position of the reflected photons on a fictitious transverse plane on which the filter aperture would look like a ring in which most of the photons within the narrow bandwidth are located, whereas most other photons are outside this ring.

Preferably, the spectral filter aperture device provides a single filter gap. Alternatively, multiple filter gaps can be arranged between the reflector device and the sample. In the case of rotation symmetrical optics, a single annular orifice or a combination of a pinhole and a circular aperture can be used depending on required free distances to the focus point in the sample.

The position of the spectral filter aperture device between the X-ray optic device and the focus thereof in the sample can be selected based on raytracing simulations and/or optimization. With reducing a distance from the X-ray optic device, the size of the filter gap is reduced and requirements on positioning precisions are increased. Preferably, the spectral filter aperture device is arranged at a half distance between the centre of the X-ray optic device and the focal position thereof in the sample.

Furthermore, according to the invention, the reflector geometry, the reflector mosaicity, the reflector thickness and the acceptance angle of the polycrystalline reflector device are selected such that simultaneously (a) a radiation flux in the first spectral portion is at least 1% of an incoming flux of the same spectral portion of the X-rays received by the X-ray optic device with a peak reflectivity of at least 1%, preferably at least 5%, (b) the first spectral portion has a spectral bandwidth of at most 15%, (c) the second and third spectral portions have a flux reduced by at least three orders of magnitude compared with the flux in the first spectral portion, and (d) the X-ray beam has a focal spot size of less than 1.5 mm.

The first spectral portion is defined by the spectral bandwidth of at most 15%. The spectral bandwidth BW is a ratio $BW=(E_2-E_1)/E_{peak}$ of an energy width $E_2-E_1$ of an energy range including 68.3% of the reflected X-ray photons and an energy $E_{peak}$ of the peak intensity. With more details, the energy range which includes 68.3% of the reflected X-ray photons, is defined by a low and high energy integration border including the intensity maximum of the X-ray beam. The lower energy integration border $E_1$ is defined such that e.g. in the second spectral portion (Energy 0 keV to $E_1$) 16.35% of the total intensity are included and the high energy integration border $E_2$ is defined such that e.g. in the third spectral portion ($E_2$ to maximum energy) 16.35% of the total intensity are included.

The spot size is a characteristic diameter of the X-ray beam inside of which the X-rays intensity is above a certain fraction, e.g. 68.3%, of the total X-rays intensity in the center of a considered beam spot, e.g. the focal spot. Preferably, the X-ray beam is shaped such that it has a spot size of less than 1.5 mm, in particular in both transverse dimensions relative to the longitudinal beam axis, along the irradiated volume inside the sample, including the focal spot. The beam path length along the irradiated volume inside the sample is preferably below 10 cm, particularly preferred below 5 cm, e.g. 3 cm or less. Due to the resulting small divergence, the X-ray beam is also called "pencil beam".

To achieve the features (a) to (d) with a given X-ray source device, e.g. clinical X-ray tube, numerical raytracing calculations simulating the X-ray paths, the reflector geometry and the crystal response can be applied, e.g. using commercially or publicly available (see e.g. SHADOW [14], or [15]) or self-written software ([16]). The raytracing calculation uses the reflector geometry, the reflector mosaicity and the reflector thickness of the polycrystalline reflector device as variable input quantities for obtaining features (a) to (d) by optimizing the input quantities. The reflector geometry is determined by the shape and dimensions of the reflector carrier substrate. With preferred examples, a rotation symmetrical ellipsoidal, cylindrical or spherical shape of the reflector carrier substrate or a superposition of at least two of these shapes can be used. Designing the reflector device of the inventive X-ray irradiation apparatus by applying the raytracing calculation provides a further independent subject of the invention.

On the reflector carrier substrate, a polycrystalline reflector layer of a specific thickness is applied as a closed layer or an arrangement of plural layer sections. A single polycrystalline reflector layer is provided (it is preferably made of one single polycrystalline material), i.e. there is no multilayer reflector made of different materials. The thickness is also one of the parameters optimized by raytracing simulations. Finally, shape, position and size of the filter gap are defined by raytracing simulations to filter the required part of the reflected spectrum. A preferred carrier substance is e.g. glass.

As mentioned beforehand, the inventors have found that the reflector dispersion, i.e., the trajectories of photons with different energies along spatially separated paths, can be employed for X-ray beam design and that low-energy X-ray photons create the background noise in XRF imaging to be suppressed. Advantageously, the spectral filter aperture device is arranged for transmitting exclusively the first spectral range of interest and for blocking the low-energy photons (the second spectral portion), which also helps in reducing the radiation dose as well as increasing the detection sensitivity as the spectral background in the signal region is significantly reduced. The low-energy photons are no longer able to reach the sample by this blocking effect of the spectral filter aperture device. Furthermore, the spectral filter aperture device is arranged for blocking X-ray photons with energies (the third spectral portion) higher than the first spectral range. While the higher-energy photons do not contribute significantly to the XRF-signal strength, they increase the spectral background noise and radiation dose. Accordingly, blocking the third spectral portion has a particular advantage in terms of reducing the radiation dose.

Thus, the spectral filter aperture device is a spatial filter for cutting the first spectral range out of the spectrum emitted by the X-ray source device and reflected from the X-ray optic device. By adjusting the position of the spectral filter aperture device, in particular the distance from the output end of the reflector along the beam axis, and the radial width of the filter gap, the energies of the first spectral range can be precisely set. This can be done by calibration measurements and/or by numerical simulations.

The inventors have investigated the effect of the spectral filter aperture device by raytracing simulations and test measurements. The low and high energy parts of the spectrum of the X-ray source device have been found to be drastically reduced, leading to decreased radiation exposure of the sample and increased signal-to-background ratios for the XRF imaging detection. Without this reduction of the low-energy part of the incident X-ray spectrum, XRF imaging could not reach its maximum sensitivity, because the closer the incident photon energy to the XRF imaging signal photon energy, the more probable is (single or multiple) Compton scattering of such low-energy photons covering up the fluorescence energy range, hence increasing the spectral background in the XRF-signal range and thus lowering the signal-to-noise ratio. This would make low local amounts of XRF imaging labels "invisible" in the detected spectrum, if the background noise is stronger than the signal photon counts. With the invention, a sufficient background suppression is obtained which was available in the past with nearly perfectly monochromatic synchrotron sources only. Since the access to these large synchrotron facilities is practically limited (as they are typically overbooked, such that not each beamtime proposal can be fulfilled), the invention will pave the way to a much larger dissemination of XRF imaging technology which now becomes possible to be realized with the wide-spread clinical X-ray tubes.

Furthermore, the inventors have found that X-rays being suitable for highly sensitive XRF imaging applications can be obtained by setting the above features (a) to (d). In particular, the inventors have found that the above features (a) to (d) can be provided by setting the reflector geometry, the reflector mosaicity and the reflector thickness of the X-ray optic device. The particular features of the reflector geometry, the reflector mosaicity, the reflector thickness and the acceptance angle of the X-ray optic device can be selected on the basis of test experiments and/or numerical ray tracing simulations. With a preferred example, in particular for the first spectral portion having an energy between 25 keV and 100 keV and with a reflector having a shape of a hollow cylinder, the reflector mosaicity is selected below 1.0° and typically in a range from 0.05° to 0.4° and the reflector thickness is selected in a range from 50 μm to 500 μm, while the acceptance solid angle of the X-ray optic device is selected in a range from 100 to 1000 microsteradian.

According to a second general aspect of the invention, the above objective is solved by an X-ray fluorescence imaging apparatus, being configured for X-ray fluorescence imaging a sample to be investigated, comprising the X-ray irradiation apparatus according to the first general aspect of the invention or an embodiment thereof and being arranged for irradiating the sample with the X-ray beam having the first spectral portion of the spectral distribution, a sample stage being arranged for accommodating the sample, and an energy-dispersive detector device being arranged for detecting sample fluorescence excited by the X-ray beam. Furthermore, the X-ray fluorescence imaging apparatus is provided with a control device, e.g. a computer unit, being arranged for controlling the X-ray irradiation apparatus and processing output data of the detector device.

According to a third general aspect of the invention, the above objective is solved by a method of using an X-ray irradiation apparatus according to the first general aspect of the invention or an embodiment thereof for X-ray fluorescence imaging of a sample to be investigated. XRF imaging covers imaging applications resulting in a tomographic X-ray image of the sample under investigation and/or X-ray measurements of image features of the sample.

According to a fourth general aspect of the invention, the above objective is solved by a method of using an X-ray irradiation apparatus according to the first general aspect of the invention or an embodiment thereof for other imaging modalities which employ pencil-like X-ray beams with narrow bandwidths, e.g. for X-ray phase contrast imaging or X-ray scattering experiments. Thus, as an alternative to XRF imaging, the invention is suitable for imaging methods that also require pencil-like beams, but may have different target parameters in energy, flux, bandwidth, and aperture angle.

An important advantage of the invention results from the fact that the properties of the reflector device material, e.g. HOPG or HAPG material, in particular including the integral reflectivity and malleability thereof, are combined with the selected reflector device geometry, so that the beam parameters of a conventional divergent X-ray source can be optimized and e.g. X-ray imaging applications are made available with low costs and maximum imaging sensitivity. Advantageously, the X-ray source device may include a conventional X-ray source, e.g. an available clinical X-ray source, so that by combining with the inventive X-ray optics, XRF imaging is made possible like at a synchrotron. Furthermore, the combination of the X-ray source with the X-ray optics provides a compact X-ray irradiation apparatus, which can be operated at relatively low costs and without the need of a particular qualification of the operator. In particular, the X-ray irradiation apparatus is capable of generating exactly pencil beams with sufficiently high photon energy, intensity and low bandwidth that preclinical and clinical XRF imaging is immediately applicable. Compared to all conventional alternatives, the invention is not only directly feasible in current practice, but is also most cost-effective and precise because the X-ray sources are already available, already approved and the personnel already trained. Thus, neither other special (and more expensive) X-ray sources are required, nor would the personnel have to be specially trained. The addition of the inventive X-ray optic device to a clinical X-ray tube can be done according to a standardized protocol, and then an XRF imaging mode can be run. This is a decisive step to enable the transfer of applying in XRF imaging from basic research to a very broad application, e.g. in research-based pharmaceutical companies or in future clinical diagnostics.

Advantages of the invention in particular result from the high photon energy of the X-rays, the narrow bandwidth as well as the high achievable fluxes and the small spot size irradiating the sample. This is in contrast to the conventional techniques, e.g. the conventional approaches in mammography or in diagnostics for radiotherapy ([7]). In particular, with the technique of [7], the achievable beam spot there is about 3 times larger than the spot size achieved with the invention. The achievable fluxes of the conventional techniques are more than two orders of magnitude smaller than the fluxes achieved with the invention using one and the same X-ray source. And, in particular, the spectral width is too broad for allowing high-sensitivity XFI-measurements.

According to a preferred embodiment of the invention, the reflector geometry, the reflector mosaicity and the reflector thickness of the X-ray optic device are selected and the spectral filter aperture device is configured such that the first spectral portion of the spectral distribution is included in an energy range from 25 keV to 100 keV, in particular in an energy range equal to or above 60 keV, e.g. up to 85 keV or even higher up to 100 keV. This energy range has particular advantages for sensitive XRF imaging with available label atoms.

Preferably, the spectral filter aperture device includes at least one X-ray blocking material which creates the filter gap and which has an X-ray absorption and is capable of a reduction of intensity by at least two orders of magnitude for every part of the spectrum. Preferably, the X-ray blocking material includes Molybdenum (Mo) or Tungsten (W). Advantageously, these materials have a high blocking effect, so that the spectral filter aperture device can be provided with low complexity and small thickness along the beam axis. Adjusting the spectral filter aperture device is facilitated. The X-ray blocking material may consist of Mo and/or W, or it may comprise an alloy including Mo and/or W. Another example of an X-ray blocking material is copper (Cu).

According to a further preferred embodiment of the invention, at least one of the reflector device and the spectral filter aperture device is adapted for shifting along the beam axis, in particular for tuning a distance between the reflector device, e.g. an output end thereof, and the spectral filter aperture device, e.g. the location of the filter gap on the beam axis, and for setting the energies of the first spectral portion transmitted through the spectral filter aperture device. As an example, the spectral filter aperture device may be adapted for shifting the filter gap along the beam axis. Additionally, or alternatively, the spectral filter aperture device may be adapted for adjusting a filter gap width. With a further option, the reflector device may be shifted along the beam axis. Advantageously, with these features of adjusting the distance between the reflector device and the spectral filter aperture device and/or the radial width of the filter gap, the first spectral range effectively can be set. The X-ray beam created with the inventive technique is tunable in energy. This is a significant advantage because one can optimize the XRF imaging by optimizing the energy for each sample to be irradiated and XRF label atom used, which is facilitated by a tunable X-ray source. Tuning the energy can be obtained within short operation times of some minutes. On the contrary, changing the energy at a synchrotron may take hours.

Preferably, for the energy tuning function, at least one of the reflector device and the spectral filter aperture device is coupled with a carrier device being arranged for shifting the coupled device(s) parallel to the beam axis, and/or the spectral filter aperture device is coupled with a filter gap setting device being arranged for radially shifting components of the spectral filter aperture device for setting the radial width of the filter gap.

In order to maintain a high photon flux when adjusting the above distances, in a further embodiment the X-ray optic device may be adapted, e.g. the X-ray optic device may be exchanged by another optic with different geometry, especially with an adjusted inner diameter such that the Bragg-condition is fulfilled for the new desired energy of the resulting pencil beam.

According to a particularly preferred embodiment of the invention, the X-ray optic device is configured such that the X-ray beam has a beam focus with the focal spot size in both transverse dimensions in a range from 0.5 mm to 1.5 mm and a beam spot size increase of less than 50% at a sample's entrance surface compared to the focal beam size. As an example, the sample's entrance surface is preferably 50 mm or less, particularly preferred 25 mm or less, e.g. 15 mm or less apart from the focal spot position, e.g. in case of small-animal imaging. With another example, the sample's entrance surface is preferably 20 cm or less, particularly preferred 15 cm or less, e.g. 10 cm or less apart from the focal spot position, e.g. in case of large-animal or human imaging. These ranges provide advantages for imaging modalities with high spatial resolution in the range of millimeters or sub-millimeters.

The polycrystalline reflector device may comprise an integral component (single hollow reflector extending along the beam axis) or an arrangement of multiple components (multiple reflector elements being arranged along the beam axis with reflector element surfaces facing to the beam axis).

The reflector surface or all sections thereof is/are concave. The reflector device is configured for a 1:1 imaging factor of the emitting source of the X-ray source device, e.g. the anode or the output of the LINAC source. Preferably one single reflector device is provided, i.e. there is only one integral reflective component or only one group of multiple reflective components which only commonly are capable to reflect the X-ray beam. The single reflector device has an advantage in terms of saving space between the X-ray source device and the spectral filter aperture device. Alternatively, multiple reflector devices can be provided. Advantageously, this allows an adaptation of the beam path to the geometry of the application site, e.g. of the X-ray imaging apparatus. In case of multiple reflector devices, preferably the first reflector device downstream from the X-ray source device provides the beam parameters set according to the invention.

Preferably, the polycrystalline reflector device has a shape of a hollow circular cylinder or a hollow ellipsoid shape. Thus, advantages in terms of a compact reflector geometry are obtained. The term "circular cylinder" covers not only a geometrically ideal cylinder, but also a cylinder with deviations from the ideal geometry, in particular with a bending of the inner reflector surface towards the beam axis such that setting the divergence of the X-ray beam is facilitated. Alternatively, the polycrystalline reflector device has a spherical reflector shape with a stepped surface with Johansson geometry or with Johann geometry (see e.g. [18] or [19]), comprising spherical step sections with step edges therebetween. Advantageously, the stepped geometry allows for a more accurate match of desired Bragg angle and actual reflection position along a larger reflector length such that the focus size can be minimized while further increasing the reflected flux within the first spectral portion.

The ellipsoid reflector shape and even more the spherical reflector shape with a stepped reflector surface have an advantage, that the length of the reflector device along the beam path can be increased compared with the cylinder shape. Accordingly, the resulting flux of the reflected X-ray beam can be increased as the acceptance solid angle is increased, while for each position in the X-ray optics the Bragg-condition within the limits of the crystal mosaicity is still fulfilled. Compared with the other shapes, the spherical reflector shape with the stepped reflector surface has the additional advantage of a narrower spectral bandwidth of the reflector device.

In case of the Johansson geometry, the step edges are arranged on the manifold of Rowland circles possible with equal radius on which the X-ray source device and the sample are positioned. The Johansson geometry may be provided with a single or double bent polycrystalline material, with one bending radius of the crystal planes being twice the radius of the Rowland circle and the bending radius of the surface being the distance between optics surface at each point and the optical axis (line between source and focus position). With single ideal crystals, only the first bending radius would be realized. The Johann geometry also may be provided with a single or double bent polycrystalline material (e.g. torus shaped) with one bending radius being twice the radius of the Rowland circle. The bent ideal crystals can be obtained from perfect crystals by milling and arranging the crystals on a bent carrier surface. For the thin mosaic crystals, the carrier substrate with a stepped carrier surface is provided. Furthermore, mosaic-based crystals can be bent in the second direction (due to the substrate shape), which is technically not possible with perfect crystals with available techniques and allows for a better approximation of the preferable Johansson geometry.

According to further particularly preferred embodiments of the invention, the polycrystalline reflector device is made of pyrolytic graphite. Employing pyrolytic graphite has advantages in terms of providing mosaic crystals on a curved and optionally stepped carrier substrate. In pyrolytic graphite crystals, mosaicity can be optimized, thus maximizing reflectivity and X-ray flux, while lowering the bandwidth. In addition, the divergent radiation from the X-ray source can be captured from a larger solid angle and directed onto the sample with the inventive low divergence.

Preferably, the pyrolytic graphite comprises Highly Oriented Pyrolytic graphite (HOPG) or Highly Annealed Pyrolytic Graphite (HAPG), which are deposited on the reflector carrier substrate. HOPG may have advantages in terms of the reflector layer thickness (e.g. up to 2 mm), while having a mosaicity of down to 0.2°. Using HAPG crystals as a reflector material may have advantages for decreasing the X-ray focus size and spectral bandwidth for irradiating the sample and a mosaicity of below 0.1°. Thus, HAPG crystals achieve optimized mosaicity that maximizes, in combination with the spectral filter gap, the signal to noise ratio. The mosaicity, which describes a deviation from the ideal crystal, results in a high integral reflectivity over a wider bandwidth range, around the energy suitable for the Bragg angle. In addition, HAPG-based material is extremely flexible and can be applied to highly curved surfaces. Thus, HAPG crystals have particular advantages in terms of flexibility in selecting the reflector geometry, in particular with regard to radii of curvature of the reflector surface.

According to alternative preferred embodiments of the invention, the polycrystalline reflector device is made of metallic crystals, e.g. made of Al or Cu, or diamond or other solid solutions like crystalline alloys, e.g. di-atomic crystals like GaAs. Employing metallic crystals, diamonds or other solid solutions may offer advantages in terms of increased X-ray reflectivity and/or beam sizes and/or spectra bandwidth.

If, according to another preferred embodiment of the invention, at least one additional scattering absorber, e.g. a cone-like tube aperture (or: tube aperture), is arranged downstream of the X-ray optic device, in particular between the X-ray optic device and the spectral filter aperture device or preferably downstream of the spectral filter aperture device, i.e. between the spectral filter aperture device and the sample, advantages in terms of further suppressing background noise are obtained, for instance from Rayleigh- and/or Compton-scattered photons off the X-ray optics.

Preferably, a beamstop component is arranged on the beam axis within the X-ray optic device or between the X-ray source device and the X-ray optic device for blocking radiation travelling along the beam axis. Particularly preferred, the beamstop component is made of an X-ray blocking material, like Mo or W. Advantageously, the direct, i.e. non-reflected and non-scattered radiation emitted by the X-ray source device is blocked by the beamstop component.

Figure 2:
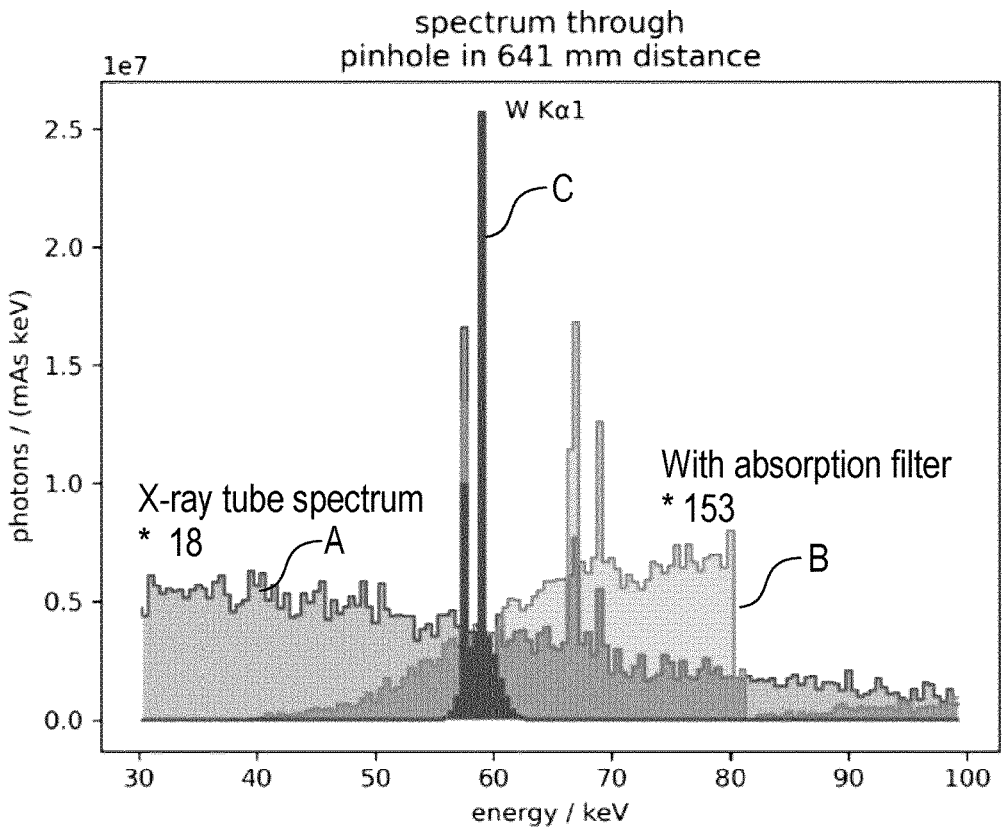
Figure 3:
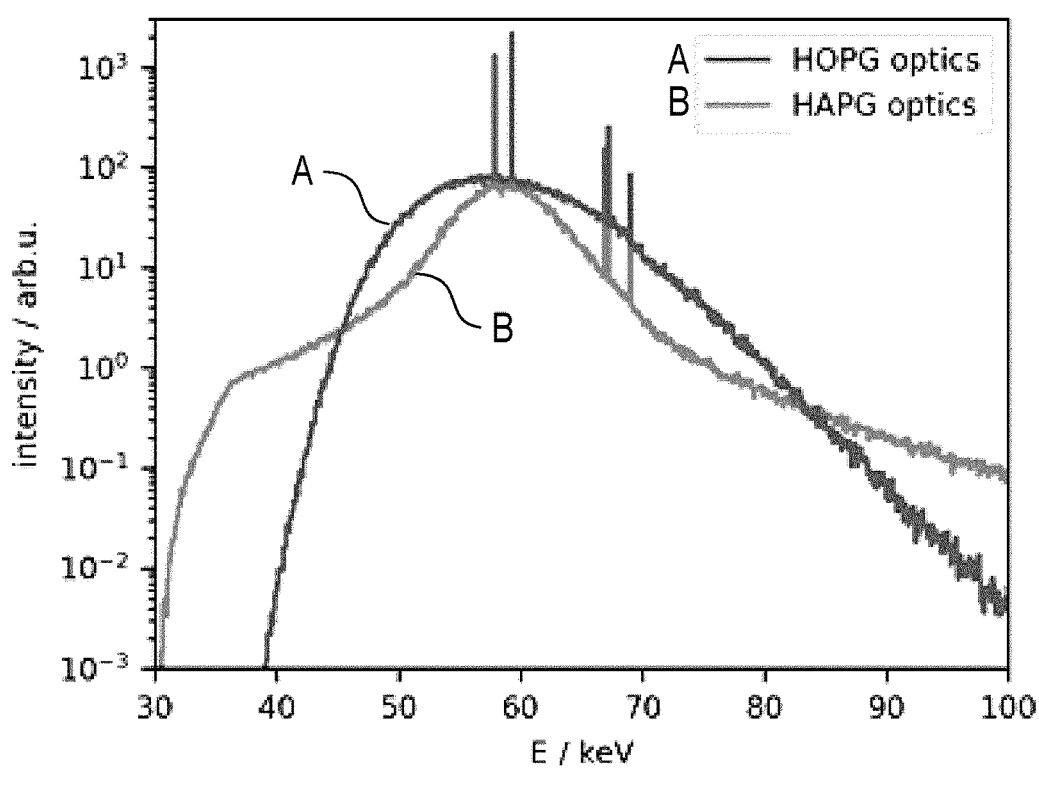
Figure 4:
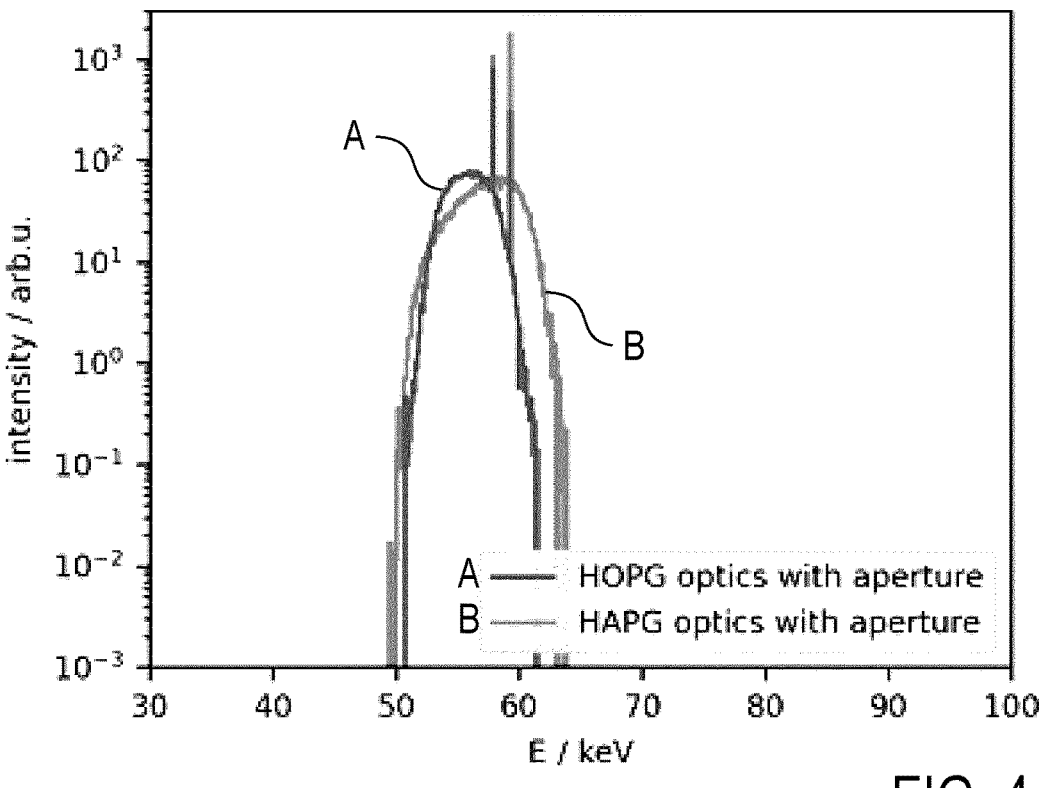
Figure 5:
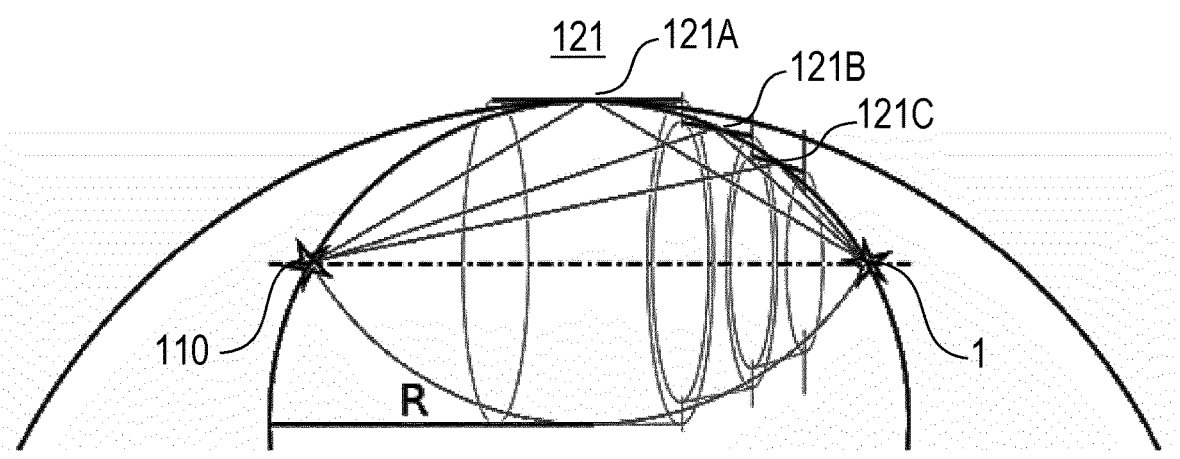
Figure 6:
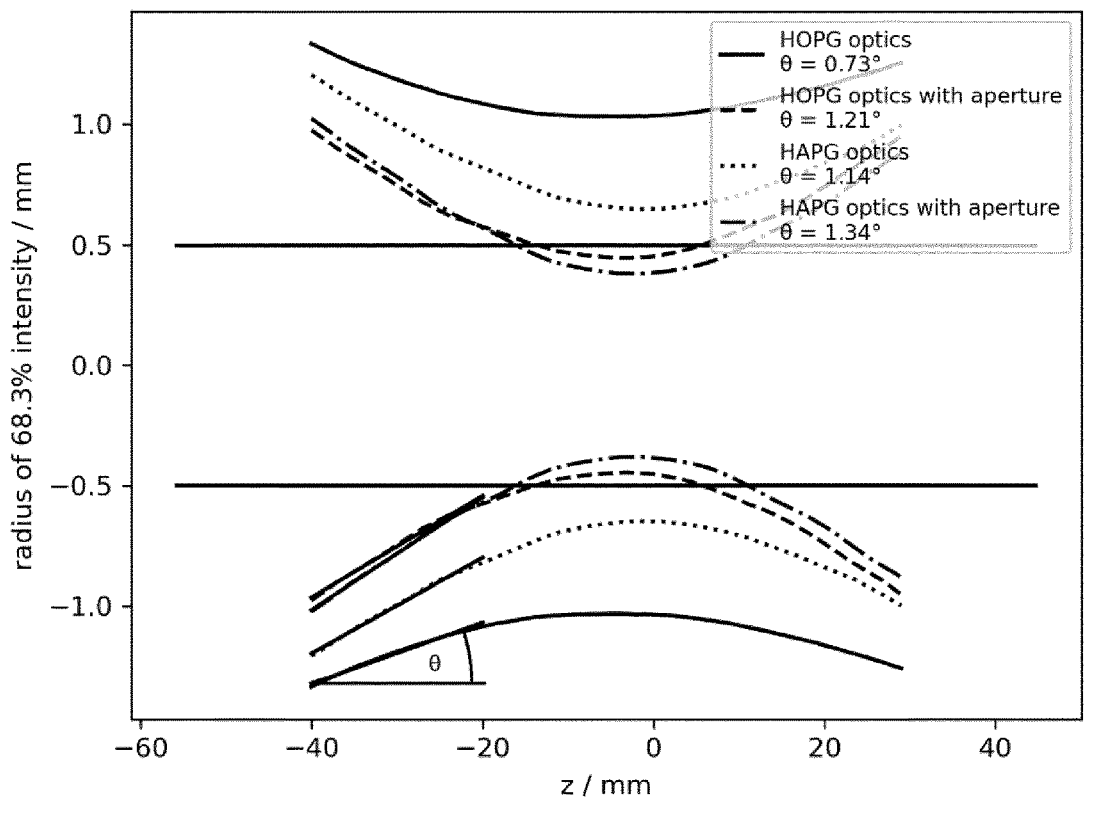

Further details and advantages of the invention are described in the following with reference to the attached drawings, which show in:

FIG. 1: a schematic illustration of an X-ray fluorescence imaging apparatus including an X-ray irradiation apparatus according to advantageous embodiments of the invention;

FIG. 2: a graphical illustration of advantageous beam properties obtained with the invention;

FIGS. 3 and 4: graphical illustrations of the effect of the spectral filter aperture device included in the X-ray irradiation apparatus according to the invention;

FIG. 5: a schematic reflector geometry illustration according to further advantageous embodiments of the invention;

FIG. 6: a graphical illustration of the shape of the X-ray beam at the focal spot in a sample like a small animal (e.g. mouse);

FIG. 7: a measured cross-sectional image of the X-ray beam leaving the X-ray optic device (measured before the focus plane); and FIGS. 8 to 10: illustrations of the provision of an scattering absorber downstream of the X-ray optic device.

PREFERRED EMBODIMENTS OF THE INVENTION

Features of preferred embodiments of the invention are described in the following with exemplary reference to the XRF imaging application of the inventive X-ray irradiation apparatus. It is noted that the invention is not restricted to this application of the X-ray irradiation apparatus but possible with alternative applications for another imaging modality, e.g. phase contrast imaging, material processing of samples and/or testing of samples. Details of XRF imaging are not described, but can be implemented e.g. as described in [12] and [13]). The invention is not restricted to details presented in an exemplary manner. For example, HOPG or HAPG may be replaced by another polycrystalline material, like metallic crystals or diamond crystals, as long as the mosaicity is as small as in case of HOPG/HAPG.

FIG. 1 schematically illustrates an embodiment of the inventive X-ray irradiation apparatus 100 included in the X-ray fluorescence imaging apparatus 200 for imaging the sample 1 under investigation. The X-ray irradiation apparatus 100 is arranged for irradiating the sample 1 on the sample stage 210 along the beam axis 3 with the X-ray beam 4. The sample stage 210 is adapted for scanning the sample 1 in space along at least one of two orthogonal directions perpendicular to the direction of the beam axis 3. Furthermore, the X-ray fluorescence imaging apparatus 200 comprises the energy-dispersive detector device 220 for detecting sample fluorescence excited in the sample 1 by the X-ray beam 4 and/or for recording an X-ray fluorescence spectrum with spatial resolution.

The X-ray irradiation apparatus 100 comprises an X-ray source device 110 for creating X-rays 2. The X-ray source device 110 is e.g. a clinical X-ray tube made by Siemens Healthineers or Varex Imaging. The X-rays 2 have a polychromatic spectrum (see curve A of FIG. 2). Preferably, the X-ray tube is configured for an operation with an acceleration voltage above 120 kV and a tube current of about 30 mA.

Furthermore, the X-ray irradiation apparatus 100 comprises an X-ray optic device 120 being arranged with a longitudinal beam axis 3, which extends from the X-ray source device 110 to the sample 1. The X-ray optic device 120 has a polycrystalline reflector device 121 comprising a mosaic crystal-based reflector layer on a carrier substrate. The reflector device 121 preferably has a fully rotational symmetric ellipsoidal or cylindrical shape. Other shapes are possible as well (see e.g. FIG. 5). The reflector layer is made of HOPG, e.g. with a thickness of 0.2 mm, a reflector mosaicity of 0.4° and an acceptance solid angle of 600 μsr, or HAPG, e.g. with a thickness of 0.1 mm, a reflector mosaicity of 0.1° and an acceptance angle of 600 μsr. The reflector device 121 has an axial length of e.g. 3.2 cm and an inner diameter of the reflector layer of e.g. 2 cm. The distance of the input end of the reflector device 121 from the X-ray source device 110 is e.g. 30.5 cm, and the distance of the output end of the reflector device 121 to the sample 1 is e.g. 30.5 cm.

Downstream of the reflector device 121, the X-ray irradiation apparatus 100 comprises the spectral filter aperture device 122, made of an X-ray blocking material 124, like W, with a ring-shaped slit, which provides the axially centred filter gap 123. The distance of the output end of the reflector device 121 to the spectral filter aperture device 122 is e.g. 12.5 cm, and the radial width of the filter gap 123 is e.g. 2 mm centered at a radius of 5.5 mm. The spectral filter aperture device 122 may have a more complex structure made of components having one or two apertures being aligned for providing the filter gap 123.

The spectral filter aperture device 122 has the following advantageous effect (see FIGS. 3 and 4). The mosaicity of the applied optical material (e.g. HOPG or HAPG) introduces dispersion, thus leading to an angular, i.e., spatial separation of X-ray energies, as shown in FIG. 7, and allowing to further spatially filter the emitted spectrum from the X-ray source with the spectral filter aperture device 122. The X-ray beam 4 leaving the reflector device 121 has a spectral distribution with different spectral portions, which are called here the first spectral portion 4A, the second spectral portion 4B and the third spectral portion 4C (schematically shown in FIG. 1). The first spectral portion 4A with higher energies than the second spectral portion 4B and lower energies than the third spectral portion 4C is spatially separated from the other spectral portions 4B, 4C with the spectral filter aperture device 122. Through the filter gap 123, the first spectral portion 4A is transmitted to the sample 1, while the second and third spectral portions 4B, 4C are blocked by the X-ray blocking material of the spectral filter aperture device 122. The X-ray beam 4 irradiating the sample, in particular the first spectral portion 4A of the X-ray beam 4 has a focal spot size of e.g. 1 mm.

In particular, the spectral filter aperture device 122 is able to simultaneously (i) select the focusing energy (first spectral portion 4A), i.e., maximizing the transmission of the whole optical system for the selected energy, (ii) remove high and low energy parts (second and third spectral portions 4B, 4C) of the excitation spectrum and thus reduce radiation exposure of the sample 1 and background in the fluorescence signal energy range, thus increasing the signal-to-noise ratio allowing further reduction of radiation exposure and measurement times, and (iii) decrease the focus width and thus help to improve the spatial resolution.

Additionally, the spectral filter aperture device 122 has an advantage in terms of spatial resolution when irradiating the sample. With the above examples, the beam profile leaving the reflector device 121 without the spectral filter aperture device 122 would have a width (diameter including 68.3% of reflected photons) in the focus plane (focal spot size) of e.g. 1.3 mm. With the spectral filter aperture device 122, the focal spot size is e.g. 0.8 mm.

The X-ray optic device 120 optionally comprises a beamstop component 125 which is positioned on the beam axis 3, e.g. at the input end of the reflector device 121, for blocking the X-ray 2 emitted directly on the beam axis 3. The beamstop component 125, being made of e.g. Mo, has a diameter of e.g. 16 mm and a thickness of e.g. 2 mm.

Optionally, the X-ray irradiation apparatus 100 further comprises at least one additional scattering absorber 126 as schematically shown in FIG. 1 downstream of the spectral filter aperture device 122. The scattering absorber 126, which is described with further details with reference to FIGS. 8 to 10 below, suppresses Rayleigh- and/or Compton-scattered photons off the X-ray optics. The scattering absorber 126 may extend along the whole length of the longitudinal axis 3 from the spectral filter aperture device 122 to the sample 1 or along a portion thereof. The downstream end of the scattering absorber 126 can be considered as an output of the X-ray irradiation apparatus 100. As an alternative to the illustration of FIGS. 1 and 8 to 10, multiple scattering absorbers (absorber sections) can be serially arranged along the longitudinal axis 3, each being configured like the single scattering absorbers shown.

The reflector device and/or the spectral filter aperture device is coupled with a carrier device (not shown) for shifting the coupled reflector device and/or the spectral filter aperture device parallel to the beam axis. The carrier device comprises e.g. a carrier platform being shiftable on carrier rods or a rail. Optionally, a filter gap setting device can be provided for radially shifting components of the spectral filter aperture device, so that the radial width of the filter gap is set.

In operation of the X-ray irradiation apparatus 100, a part of the divergent and polychromatic radiation 2 of the X-ray source device 110 is collected by the X-ray optic device 120 and refocused in the plane of the sample 1. The direct beam is blocked by the beamstop component 125. If the reflector device 121 is used as a Bragg lens with grazing incidence, the radiation 2 hits the inner crystal surface of the reflector device 121. Alternatively, if the reflector device 121 is used as a Laue lens, the radiation 2 hits the face side of the crystal of the reflector device. Due to the usage of high X-ray photon energies resulting in particular in low Bragg angles for the pyrolytic mosaic crystals of the reflector device 121, the convergence of the X-ray beam 4 is sufficiently small to perform X-ray fluorescence imaging (XRF) analysis. With a practical example, the radiation flux in the first spectral portion 4A is for photons with more than 50 keV at least 4% of the incoming flux of the same spectral portion of the X-rays 2 emitted by the X-ray source device 110, the first spectral portion 4A has a spectral bandwidth of e.g. 11% with respect to W Kα1 (59.3 keV) and the second and third spectral portions 4B, 4C have a flux reduced by at least three orders of magnitude compared with the flux in the first spectral portion 4A. The first spectral portion 4A irradiates the sample 1. Since XRF imaging is a scanning technique, either the sample 1 or, which is more appropriate in the case of clinical diagnostics with patients, the X-ray irradiation apparatus 100 is moved with respect to the stationary sample 1.

Using computer simulations modelling the beam parameters in dependency on the spectrum of the initial X-ray beam 2, the reflector geometry, the reflector mosaicity, the reflector thickness and the acceptance angle of the polycrystalline reflector device 121, the inventors have shown that the X-ray beam 4 delivered to the sample 1 sufficiently fulfills target requirements for XRF imaging, e.g. in medical diagnostics. Examples of simulation results are described in the following with reference to FIGS. 2 to 4.

FIG. 2 shows a comparison between the X-ray beam parameters as simulated by the inventors for the same X-ray tube of the X-ray source device 110. With more details, FIG. 2 shows simulated spectra of an X-ray tube with tungsten anode (with a typical anode current of 30 mA) after a pinhole of 1 mm diameter at a distance of 641 mm from the X-ray tube for different configurations. The spectra are scaled so that equal photon numbers occur in the characteristic W Kα1 (59.3 keV). Curve A shows the direct tube spectrum (shown at 18 times intensity) with its high background, for curve B (scaled at 153 times intensity) an absorption filter with 0.3 mm thick gold was simulated in the beam path to suppress the low energy background, and in curve C (without scaling) is shown the spectrum after reflection from the reflector device 121, e.g. HAPG-coated optics. The gain in efficiency for the excitation of e.g. Gd Kα (43 keV) is here about a factor of 4 compared to the unfiltered X-ray tube excitation, which however has an extremely high background interfering for the XRF imaging, and a factor of 30 compared to the X-ray tube spectrum after absorption filter, where also here the spectral background after reflection at the reflector device 121 is much better.

FIGS. 3 and 4 further show the effect of the spectral filter aperture device 122 on the spectrum reflected by a cylindrically shaped, pyrolytic graphite-based reflector device 121. FIG. 3 shows the spectrum in the sample plane without an energy-filtering filter gap 123 for a cylindrically HOPG (curve A) and HAPG (curve B) based reflector device 121 with beamstop component 125. FIG. 4 shows corresponding spectra in the sample plane with the application of the spectral filter aperture device 122, in particular with an energy-filtering filter gap 123 such that the focal spot size is also reduced to 1 mm full width at half maximum. The comparison of FIGS. 3 and 4 clearly shows that low and high energy parts of the spectra are effectively suppressed while the characteristic lines of the tube excitation are efficiently transported to the focus in sample 1. The spectrum with HAPG optics (curve B, mosaicity=0.1°, thickness=100 μm) is about 50% more intense overall (note the logarithmic scale). As an essential advantage of the invention, background suppression is not only on a range from 10% to 20%, but in more than 90%.

FIG. 5 schematically illustrates features of alternative embodiments of the invention, wherein the polycrystalline reflector device 121 has a stepped spherical reflector shape. A cross-sectional view is shown, including an illustration of the surface when exploiting the full rotation symmetry. The reflector layer of the reflector device 121 has a stepped surface with bent, in particular spherical or cylindrical and cone-shaped step sections 121A, 121B, 121C, . . . with step edges therebetween. The X-ray source device 110, in particular the anode thereof, and the sample 1 are arranged on a circle (so-called Rowland circle of radius R). The step sections 121A, 121B, 121C, . . . are rotation symmetric with respect to the optical axis connecting the X-ray source device 110 and the sample 1. The step sections 121A, 121B, 121C, . . . are local approximations to the ideal Johansson geometry. Each step section center is located on the manifold of possible Rowland circles of radius R so that the X-ray source device 110 and the sample 1 are located on the intersection of all these Rowland circles (leading to rotation symmetry). The step sections 121A, 121B, 121C, . . . have a characteristic dimension of e.g. 5 mm and the Rowland circle has a radius of e.g. 515 cm. According to the illustrated example, the spherical step sections 121A, 121B, 121C, . . . are arranged on the Rowland circle (Johansson geometry). Alternatively, the doubly bent toroidal section may be arranged on a circle with a radius being twice the radius of the Rowland circle (Johann geometry).

FIG. 6 illustrates the radius (beam size) of the first spectral portion of the X-rays reflected by the X-ray optic device as the irradiating X-ray beam to the sample around the focal position for various configurations of the X-ray optic device with and without the spectral filter aperture device (aperture). It shows that the spectral filter aperture device not only filters out the lower and higher energy spectral portions, but also reduces the beam size and thus increases the spatial resolution of the irradiation. The straight lines and the depicted angle θ indicate the beam's divergence (far away from the focal position). However, for the spatial resolution of XRF imaging the average cross-section of the volume inside the object (e.g. a small animal) which is irradiated by the pencil-beam is relevant, rather than the divergence of the beam, which is shown for completeness.

An example of the measured spatial distribution of the X-ray photons reflected by the polycrystalline reflector device 121, like HAPG optics (see FIG. 1), measured outside the focus, is shown in FIG. 7. Advantageously, a pronounced ring-like distribution is obtained which represents the first spectral portion 4A (see FIG. 1) of the photons reflected by the reflector device 121, while less photons of the second spectral portion 4B and third spectral portion 4C are measured outside the ring-like distribution. The spatial distribution is measured e.g. at a half distance between the centre of the reflector device 121 and the focal position thereof in the sample.

In FIG. 7 one can clearly see two spatially separated ring-like structures, which depict the spatial distribution of the two K-alpha emission lines of the W-anode from the X-ray source as used in this measurement. These two emission lines (at 59.3 keV and 58.0 keV) are spectrally separated by only 1.3 keV, which means that if the spatial filtering gap aperture is build and positioned in such a way that only one emission line can pass the gap, the achieved spectral width would be less than 1.0 keV, which is superior to any other X-ray optics setup based on Bragg-diffraction.

Thus, as a preferred feature of the invention, with positioning the spectral filter aperture device 122 at an axial position along the longitudinal beam axis 3 where a ring-like spatial distribution of the X-ray photons reflected by the polycrystalline reflector device 121 is measurable, in particular at the half distance between the centre of the reflector device 121 and the focal position thereof in the sample, the spectral filter aperture device 122 cuts out exactly the first spectral portion 4A to be obtained (in particular ring visible in FIG. 7) and at the same time limits the spectrum of the photons behind the ring diaphragm. Thus, photons with lower and higher energy related to the selected energy, which would be outside the ring-like spatial distribution of the X-ray photons are cut off, so that the spectral background, e.g. for the XRF imaging application, is reduced clearly more strongly than only with the optics alone.

FIG. 8 schematically illustrates the provision of a scattering absorber 126 downstream of the spectral filter aperture device 122 and the polycrystalline reflector device 121. The scattering absorber 126 is made of e.g. an X-ray absorbing metal composition, e.g. a composition of W, Ni and Fe. As a preferred example, the scattering absorber 126 may be made of a W, Ni and Fe alloy called "Densimet" (tradename).

Generally, the scattering absorber 126 has a tube shape with an inner hollow channel 126A having a first diameter at an upstream end, i.e. an end facing to the spectral filter aperture device 122, of the scattering absorber 126, and a second diameter at an opposite downstream end of the scattering absorber 126, wherein the second diameter is smaller than the first diameter. This tapering from the first to the second diameter can be obtained by a cone shaped hollow channel 126A, as shown in FIG. 9, or a cylindrical hollow channel 126A with an end diaphragm plate 126B, as shown in FIG. 10. Optionally, a front diaphragm plate 126C may be provided, which may have advantages for further absorbing scattering radiation.

With practical examples, a longitudinal length of the tube shape may be in a range from 40 mm to 60 mm, while the first diameter may be in a range from 7 mm to 10 mm, and the second diameter may be in a range from 2 mm to 4 mm. The radial thickness of the scattering absorber 126 along the tube shape may be in a range from 1 mm to 5 mm. The optional front diaphragm plate 126C may have an outer diameter in a range from 20 mm to 40 mm and a thickness in a range from 2 mm to 5 mm.

The features of the invention disclosed in the above description, the drawings and the claims can be of significance both individually as well as in combination or subcombination for the realization of the invention in its various embodiments. The invention is not restricted to the preferred embodiments described above. Rather a plurality of variants and derivatives is possible which also use the inventive concept and therefore fall within the scope of protection. In addition, the invention also claims protection for the subject and features of the subclaims independently of the features and claims to which they refer.

The invention claimed is:

1. An X-ray irradiation apparatus, being configured for irradiating a sample to be investigated, comprising:

an X-ray source device being arranged for creating X-rays with a polychromatic spectrum, an X-ray optic device with a longitudinal beam axis, wherein the X-ray optic device comprises a polycrystalline reflector device having a reflector geometry, a reflector mosaicity and a reflector thickness and the X-ray optic device is arranged for receiving a portion of the X-rays from the X-ray source device within an acceptance angle of the X-ray optic device and for creating an X-ray beam by Bragg reflection, said X-ray beam being directed along the longitudinal beam axis towards a focal position thereof and having a spectral distribution determined by the polychromatic spectrum, the reflector geometry, the reflector mosaicity, and the reflector thickness, and a spectral filter aperture device being arranged at a distance downstream from the X-ray optic device for creating a filter gap transmitting a first spectral portion of the spectral distribution of the reflected X-ray beam and blocking a second and a third spectral portion of the spectral distribution of the reflected X-ray beam, wherein the first spectral portion has higher energies than the second spectral portion and lower energies than the third spectral portion, the X-ray optic device has an acceptance solid-angle of at least 100 micro-steradian, and the reflector geometry, the reflector mosaicity, the reflector thickness and the acceptance angle of the polycrystalline reflector device are selected such that simultaneously (a) a radiation flux in the first spectral portion is at least 1% of an incoming flux of a same spectral portion of the X-rays received by the X-ray optic device with a peak reflectivity of at least 1%, (b) the first spectral portion has a spectral bandwidth of at most 15%, (c) the second and third spectral portions have a flux reduced by at least three orders of magnitude compared with the flux in the first spectral portion, and (d) the X-ray beam has a focal spot size in both transverse dimensions of less than 1.5 mm.

2. The X-ray irradiation apparatus according to claim 1, wherein the reflector geometry, the reflector mosaicity and the reflector thickness of the X-ray optic device are selected and the spectral filter aperture device is configured such that the first spectral portion of the spectral distribution is included in an energy range from 25 keV to 100 keV.

3. The X-ray irradiation apparatus according to claim 1, wherein the spectral filter aperture device includes at least one material which creates the filter gap and which is capable of a reduction of X-ray intensity by at least two orders of magnitude for every part of the spectrum.

4. The X-ray irradiation apparatus according to claim 1, wherein at least one of the polycrystalline reflector device and the spectral filter aperture device is configured for shifting along the longitudinal beam axis.

5. The X-ray irradiation apparatus according to claim 1, wherein the spectral filter aperture device is configured for adjusting a width of the filter gap.

6. The X-ray irradiation apparatus according to claim 1, wherein the X-ray optic device is configured such that the X-ray beam has a beam focus with the focal spot size in both transverse dimensions in a range from 0.5 mm to 1.5 mm and a beam spot size increase of less than 50% at an entrance surface of the sample.

7. The X-ray irradiation apparatus according to claim 1, wherein the polycrystalline reflector device has a shape of a hollow circular cylinder or a hollow ellipsoid.

8. The X-ray irradiation apparatus according to claim 1, wherein the polycrystalline reflector device has a spherical reflector shape with a stepped surface with Johann geometry or with Johansson geometry, comprising spherical step sections with step edges therebetween.

9. The X-ray irradiation apparatus according to claim 1, wherein the polycrystalline reflector device comprises at least one of pyrolytic graphite, metallic crystals, crystalline alloys and/or diamond.

10. The X-ray irradiation apparatus according to claim 1, further comprising at least one additional scattering absorber being arranged downstream of the X-ray optic device.

11. The X-ray irradiation apparatus according to claim 1, further comprising a beamstop component being arranged on the longitudinal beam axis within the X-ray optic device or between the X-ray source device and the X-ray optic device for blocking radiation travelling along the longitudinal beam axis.

12. An X-ray fluorescence imaging apparatus, being configured for X-ray fluorescence imaging a sample to be investigated, comprising the X-ray irradiation apparatus according to claim 1, being arranged for irradiating the sample with the X-ray beam having the first spectral portion of the spectral distribution, a sample stage being arranged for accommodating the sample, and an energy-dispersive detector device being arranged for detecting sample fluorescence excited by the X-ray beam.

13. A method of using an X-ray irradiation apparatus according to claim 1 for X-ray fluorescence imaging a sample to be investigated.

14. A method of using an X-ray irradiation apparatus according to claim 1 for imaging modalities, which employ pencil-like X-ray beams with narrow bandwidths.

15. The method according to claim 14 for X-ray phase contrast imaging or X-ray scattering experiments.

16. The X-ray irradiation apparatus according to claim 1, wherein the polycrystalline reflector device comprises the pyrolytic graphite, which is Highly Oriented Pyrolytic graphite or Highly Annealed Pyrolytic Graphite.

* * * * *